(12) United States Patent
Yamada

(10) Patent No.: US 10,826,986 B2
(45) Date of Patent: Nov. 3, 2020

(54) INFORMATION PROCESSING APPARATUS, MERGE METHOD, AND COMPUTER PROGRAM PRODUCT

(71) Applicant: Kazuhiro Yamada, Kanagawa (JP)

(72) Inventor: Kazuhiro Yamada, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 127 days.

(21) Appl. No.: 15/917,980

(22) Filed: Mar. 12, 2018

(65) Prior Publication Data
US 2018/0270307 A1    Sep. 20, 2018

(30) Foreign Application Priority Data

Mar. 14, 2017 (JP) ................. 2017-049231
May 2, 2017 (JP) ................. 2017-091956

(51) Int. Cl.
| | | |
|---|---|---|
| G06F 15/16 | (2006.01) | |
| H04L 29/08 | (2006.01) | |
| G06F 7/14 | (2006.01) | |
| G06F 16/27 | (2019.01) | |
| G06F 16/23 | (2019.01) | |
| G06F 16/25 | (2019.01) | |
| G06F 16/248 | (2019.01) | |

(52) U.S. Cl.
CPC ............ *H04L 67/1095* (2013.01); *G06F 7/14* (2013.01); *G06F 16/2379* (2019.01); *G06F 16/248* (2019.01); *G06F 16/256* (2019.01); *G06F 16/27* (2019.01); *H04L 67/1097* (2013.01)

(58) Field of Classification Search
CPC .................................................. H04L 67/1095
USPC .......................................................... 709/223
See application file for complete search history.

(56) References Cited

U.S. PATENT DOCUMENTS

| | | | | |
|---|---|---|---|---|
| 8,549,073 | B2* | 10/2013 | Dale | G06Q 50/01 709/204 |
| 9,323,416 | B2* | 4/2016 | Schwend | G06F 3/0481 |
| 9,430,114 | B1* | 8/2016 | Dingman | G06F 16/211 |
| 10,311,156 | B2* | 6/2019 | Stephens, Jr. | G06F 16/215 |
| 10,489,387 | B1* | 11/2019 | Rogynskyy | G06F 16/9535 |
| 2008/0222127 | A1* | 9/2008 | Bergin | G06Q 10/10 |
| 2008/0319983 | A1* | 12/2008 | Meadows | G06F 16/273 |

(Continued)

FOREIGN PATENT DOCUMENTS

| | | |
|---|---|---|
| JP | 2012-095171 | 5/2012 |
| JP | 2014-149781 | 8/2014 |

*Primary Examiner* — Hamza N Algibhah
(74) *Attorney, Agent, or Firm* — Oblon, McClelland, Maier & Neustadt, L.L.P.

(57) ABSTRACT

An information processing apparatus includes a plurality of first-information acquiring units, a second-information acquiring unit, a merge unit, and a processing unit. Each of the plurality of first-information acquiring units is configured to acquire, from a corresponding cloud among a plurality of clouds that manage first information, the first information in a mode according to the cloud. The second-information acquiring unit is configured to acquire second information. The merge unit is configured to merge the first information acquired by any one of the first-information acquiring units with the second information acquired by the second-information acquiring unit. The processing unit is configured to perform processing based on merge information that is obtained by merging the first information and the second information.

16 Claims, 20 Drawing Sheets

| id | name | nameRoman | phoneNum | faxNum | email | TYPE | ACCOUNT INFORMATION |
|---|---|---|---|---|---|---|---|
| 3 | 鈴木太郎 | Suzuki Taro | 1111111111 | 9999999999 | taro.suzuki@aaa.com | SHARED | |
| 4 | 鈴木花子 | Suzuki Hanako | 2222222222 | 8888888888 | hanako.suzuki@aaa.com | SHARED | |
| 5 | 山田太郎 | Yamada Taro | 3333333333 | 7777777777 | taro.yamada@aaa.com | PERSONAL | yamada |
| 1 | 山田花子 | Yamada Hanako | 4444444444 | 6666666666 | hanako.yamada@aaa.com | PERSONAL | hanako |

(56) References Cited

U.S. PATENT DOCUMENTS

| | | | |
|---|---|---|---|
| 2008/0320012 A1* | 12/2008 | Loving | G06F 16/213 |
| 2010/0100952 A1* | 4/2010 | Sample | H04L 51/066 |
| | | | 726/9 |
| 2010/0198854 A1* | 8/2010 | Chitturi | G06F 16/951 |
| | | | 707/760 |
| 2011/0113073 A1* | 5/2011 | Chang | G06F 16/20 |
| | | | 707/803 |
| 2013/0110907 A1* | 5/2013 | Sherwin | G06Q 10/00 |
| | | | 709/203 |
| 2014/0066044 A1* | 3/2014 | Ramnani | H04L 67/306 |
| | | | 455/418 |
| 2014/0195494 A1* | 7/2014 | Guru | G06F 16/215 |
| | | | 707/692 |
| 2014/0201279 A1* | 7/2014 | Turakhia | G06Q 10/10 |
| | | | 709/204 |
| 2014/0258162 A1* | 9/2014 | Maran | G06F 16/24 |
| | | | 705/325 |
| 2015/0172419 A1* | 6/2015 | Toledo | H04L 67/42 |
| | | | 709/203 |
| 2015/0222701 A1* | 8/2015 | Zehavi | H04L 67/1095 |
| | | | 709/204 |
| 2017/0053127 A1* | 2/2017 | Hegfield | G06F 16/24564 |
| 2017/0286551 A1* | 10/2017 | Wu | G06F 16/2465 |

* cited by examiner

FIG.6

| id | name | nameRoman | phoneNum | faxNum | email |
|---|---|---|---|---|---|
| 1 | 山田<br>花子 | Yamada<br>Hanako | 2222222222 | 8888888888 | hanako.yamada@aaa.com |

FIG.7

| id | name | phoneticName | phoneNumber | faxNumber | mailAddress |
|---|---|---|---|---|---|
| 1 | 山田<br>太郎 | Yamada<br>Taro | 1111111111 | 9999999999 | taro.yamada@aaa.com |

FIG.8

| INFORMATION PROCESSING APPARATUS | CLOUD A | CLOUD B | ... |
|---|---|---|---|
| name | name | name | |
| phoneticName | nameRoman | Roman | |
| phoneNumber | phoneNum | phoneNo | |
| faxNumber | faxNum | faxNo | |
| mailAddress | email | mail | |
| ... | ... | ... | |

FIG.9

| name | phoneticName | phoneNumber | faxNumber | mailAddress |
|---|---|---|---|---|
| 山田太郎 | Yamada Taro | 1111111111 | 9999999999 | taro.yamada@aaa.com |
| 山田花子 | Yamada Hanako | 2222222222 | 8888888888 | hanako.yamada@aaa.com |

FIG.10

| ADDRESS-BOOK SYNCHRONIZATION SETTING |
|---|

ACCOUNT SETTING

USER ID — UserA

PASSWORD — ****

SYNCHRONIZATION SETTING

SYNCHRONIZATION START TIME — 12:00

OVERWRITE DATA AT SYNCHRONIZATION — ● YES ○ NO

MANUAL SYNCHRONIZATION — YES

FIG.14

| id | name | nameRoman | phoneNum | faxNum | email | lastAccessDate |
|---|---|---|---|---|---|---|
| 1 | 山田花子 | Yamada Hanako | 2222222222 | 8888888888 | hanako.yamada@aaa.com | 2016/8/1 |

FIG.16

| id | name | nameRoman | phoneNum | faxNum | email | TYPE | ACCOUNT INFORMATION |
|---|---|---|---|---|---|---|---|
| 3 | 鈴木太郎 | Suzuki Taro | 1111111111 | 9999999999 | taro.suzuki@aaa.com | SHARED | |
| 4 | 鈴木花子 | Suzuki Hanako | 2222222222 | 8888888888 | hanako.suzuki@aaa.com | SHARED | |
| 5 | 山田太郎 | Yamada Taro | 3333333333 | 7777777777 | taro.yamada@aaa.com | PERSONAL | yamada |
| 1 | 山田花子 | Yamada Hanako | 4444444444 | 6666666666 | hanako.yamada@aaa.com | PERSONAL | hanako |

FIG.21

| ACCOUNT INFORMATION FOR INFORMATION PROCESSING APPARATUS | ACCOUNT INFORMATION FOR CLOUD SERVER | |
|---|---|---|
| | ACCOUNT | PASSWORD |
| YamadaTaro | yamada | yamada |
| YamadaHanako | hanako | hanako |

INFORMATION PROCESSING APPARATUS, MERGE METHOD, AND COMPUTER PROGRAM PRODUCT

CROSS-REFERENCE TO RELATED APPLICATIONS

The present application claims priority under 35 U.S.C. § 119 to Japanese Patent Application No. 2017-049231, filed on Mar. 14, 2017 and Japanese Patent Application No. 2017-091956, filed on May 2, 2017. The contents of which are incorporated herein by reference in their entirety.

BACKGROUND OF THE INVENTION

1. Field of the Invention

The present invention relates to an information processing apparatus, a merge method, and a computer program product.

2. Description of the Related Art

A technique of synchronizing an address book managed by an information processing apparatus with an address book managed by a server on an intranet by interacting with the server that manages the address book in a centralized manner, such as a lightweight directory access protocol (LDAP) server, or Active Directory has conventionally been known (For example, Japanese Unexamined Patent Application Publication No. 2014-149781).

In this kind of technique, a server on an intranet that manages an address book and an information processing apparatus are connected to be interactive generally by installing software having functions of acquiring an address book from a server on an intranet, acquiring an address book from an information processing apparatus, merging the address books, and registering the merged address book in the information processing apparatus.

In recent years, cloud services to manage information such as an address book on the Internet have also been provided. For such a cloud service to manage information such as an address book on the Internet, specifications such as a data management format and an acquisition format (protocol) generally differ per service.

Therefore, when linking a cloud service to manage information, such as an address book, on the Internet and an information processing apparatus, it is necessary to develop software as described above for each cloud service so that all possibly-linked cloud services are supported, and a human cost and a financial cost increase.

SUMMARY OF THE INVENTION

According to one aspect of the present invention, an information processing apparatus includes a plurality of first-information acquiring units, a second-information acquiring unit, a merge unit, and a processing unit. Each of the plurality of first-information acquiring units is configured to acquire, from a corresponding cloud among a plurality of clouds that manage first information, the first information in a mode according to the cloud. The second-information acquiring unit is configured to acquire second information. The merge unit is configured to merge the first information acquired by any one of the first-information acquiring units with the second information acquired by the second-information acquiring unit. The processing unit is configured to perform processing based on merge information that is obtained by merging the first information and the second information.

BRIEF DESCRIPTION OF THE DRAWINGS

FIG. 6 illustrates one example of an address book of one person in first information of the embodiment;

FIG. 7 illustrates one example of an address book of one person in second information of the embodiment;

FIG. 8 illustrates one example of conversion information of the embodiment;

FIG. 9 illustrates one example of a merge result (merge information) of the embodiment;

FIG. 10 illustrates one example of an address-book-synchronization setting screen of the embodiment;

FIG. 14 illustrates one example of an address book of one person in first information of a first modification;

FIG. 16 illustrates an address book that is managed by the cloud server;

FIG. 21 illustrates one example of account information that is managed by the information processing apparatus;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
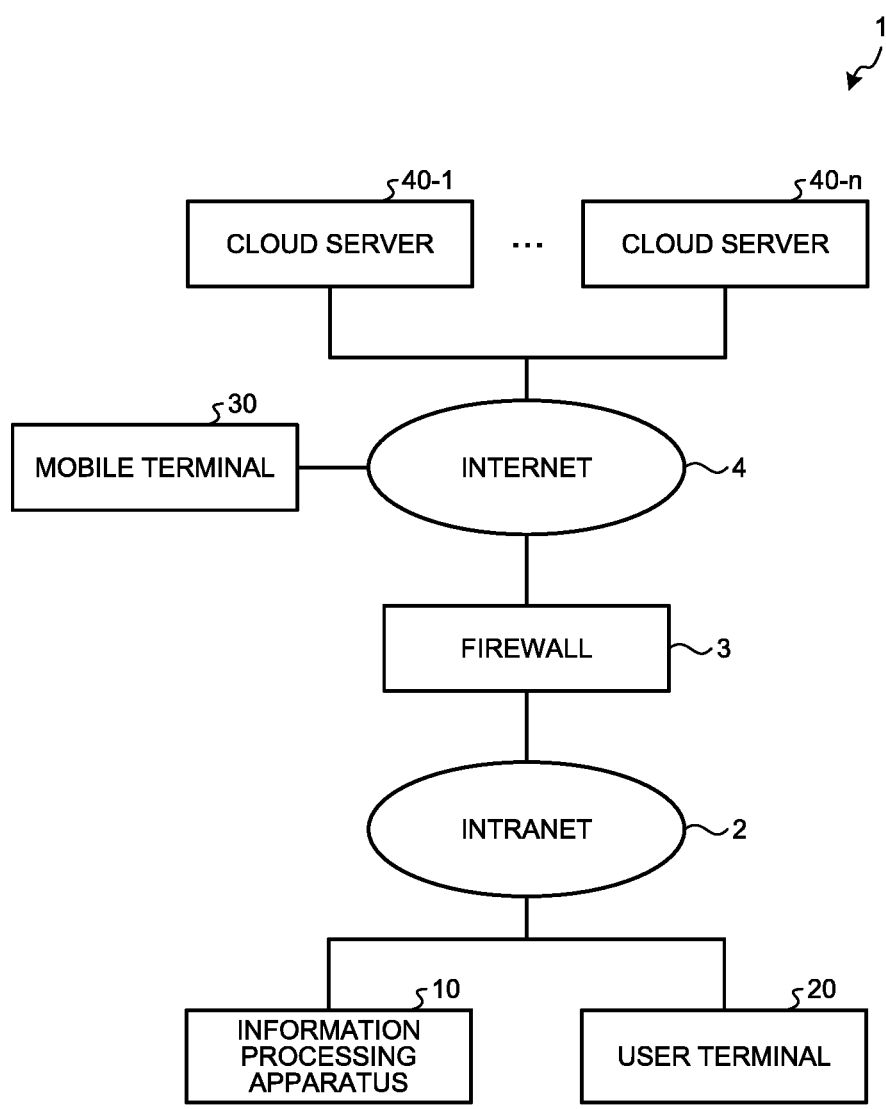
FIG. 1 is a block diagram illustrating one example of a configuration of an information processing system of an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an information processing apparatus that enables linkage with multiple cloud services that manage information in different formats while suppressing costs.

FIG. 1 is a block diagram illustrating one example of a configuration of an information processing system 1 of a present embodiment. As illustrated in FIG. 1, the information processing system 1 includes an information processing apparatus 10, a user terminal 20, a mobile terminal 30, and cloud servers 40-1 to 40-n (n is a natural number equal to 2 or larger).

The information processing apparatus 10 and the user terminal 20 are connected to an intranet 2, and the cloud servers 40-1 to 40-n are connected to the Internet 4. Moreover, the intranet 2 and the Internet 4 are connected through a firewall 3. That is, in the present embodiment, the information processing apparatus 10 and the user terminal 20 are communicably connected to the cloud servers 40-1 to 40-n through the intranet 2, the firewall 3, and the Internet 4.

The mobile terminal 30 is connectable to the Internet 4 by using a 3G or 4G telephone line, Wi-Fi (registered trademark), or the like and can be communicably connected to the cloud servers 40-1 to 40-n through the Internet 4.

The intranet 2 can be a local area network (LAN), or a wide area network (WAN). A network structured with the intranet 2, the firewall 3, and the Internet 4 can be constructed with wire, constructed wirelessly, or constructed by using the both.

Although the present embodiment is explained with a case in which the information processing apparatus 10 is an image forming apparatus, such as a multifunction peripheral (MFP) and a facsimile device, as an example, it is not limited thereto. The MFP is one having at least two functions out of a copier function, a printer function, a scanner function, and a facsimile function.

Figure 2:
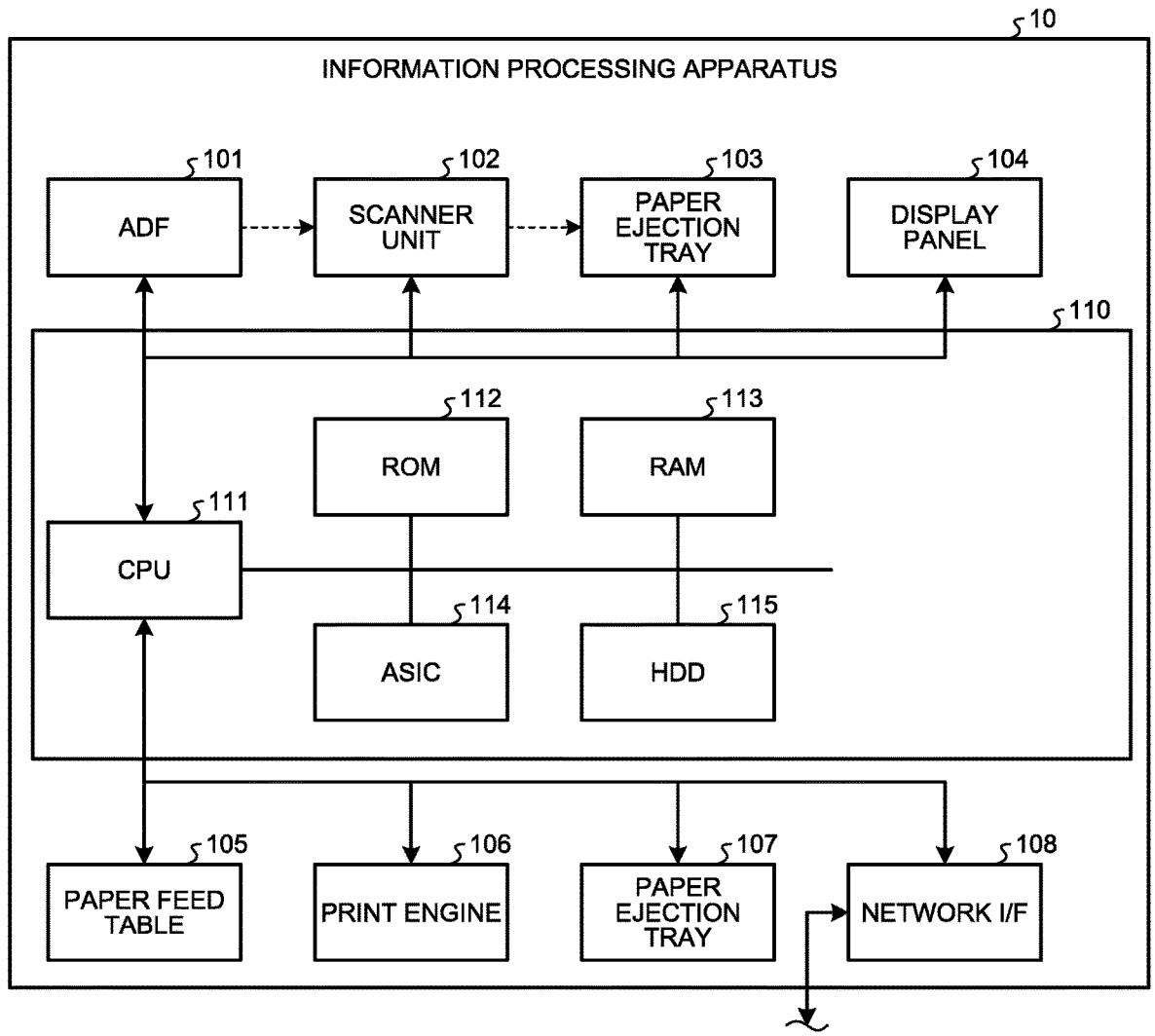
FIG. 2 is a block diagram illustrating one example of a hardware configuration of an information processing apparatus of the embodiment.

FIG. 2 is a block diagram illustrating one example of a hardware configuration of the information processing apparatus 10 according to the present embodiment. As illustrated in FIG. 2, the information processing apparatus 10 of the present embodiment includes an auto document feeder (ADF) 101, a scanner unit 102, a paper ejection tray 103, a display panel 104, a paper feed table 105, a print engine 106, a paper ejection tray 107, a network interface (I/F) 108, and a controller 110.

The network I/F 108 is an interface for the information processing apparatus 10 to perform communication through the intranet 2, and can be Ethernet (registered trademark), a universal serial bus (USB), or the like. The network I/F 108 enables communication, for example by a TCP/IP protocol. Moreover, the network I/F 108 serves as an interface to execute facsimile transmission when the information processing apparatus 10 serves as a facsimile. Therefore, the network I/F 108 is connected to a telephone line also.

The controller 10 controls each component of the information processing apparatus 10, and includes a central processing unit (CPU) 111, a read only memory (ROM) 112, a random-access memory (RAM) 113, an application specific integrated circuit (ASIC) 114, and a hard disk drive (HDD) 115.

The CPU 111 executes program that is stored in the ROM 112, the HDD 115, or the like using the RAM 113 as a work area. Thus, the CPU 111 controls overall operations of the information processing apparatus 10. Specifically, the CPU 111 implements a scanning operation by controlling a drive of the scanner unit 102, or implements a printer operation by controlling a drive of the print engine 106.

Furthermore, the CPU 111 displays information on the display panel 104, or informs the CPU 111 of information input through the display panel 104. Moreover, the CPU receives information from outside through the network I/F 108, or transmits information to outside.

The ASIC 114 generates drawing information based on image information to be printed. This drawing information is information to draw an image that is to be formed by an image forming operation by the print engine 106. Furthermore, the ASIC 114 processes imaging data (scan data) that is input from the scanner unit 102 to generate image data. This image data is stored in the HDD 115 or output to outside by facsimile transmission or the like through the network I/F 108 as a resultant of the scanning operation.

The information processing apparatus 10 of the present embodiment has the configuration as described above and, therefore, can capture image data by scanning an original, and can process the captured image data according to a program.

Referring back to FIG. 1, each of the cloud servers 40-1 to 40-n is a server device that manages an address book on the Internet, that adds an entry to an address book in response to a request from outside, and that provides it to outside. Each of the cloud servers is implemented by one or more computers. In the present embodiment, a case in which the cloud servers 40-1 to 40-n are operated respectively by different operating entities, and specifications, such as a management format and an acquisition format (protocol) of address book data, differ from each other is explained as an example, but it is not limited thereto. In the following explanation, when it is not necessary to distinguish each of the cloud servers 40-1 to 40-n, a term "cloud server 40" can be used simply.

Figure 3:
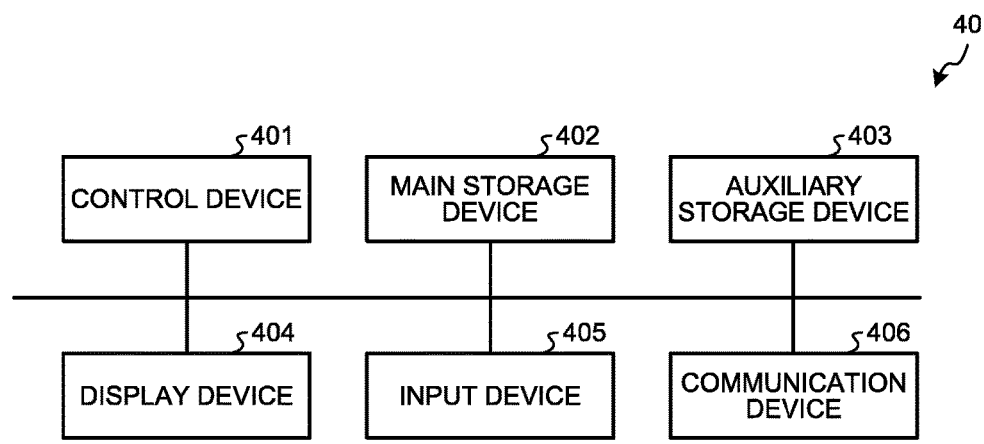
FIG. 3 is a block diagram illustrating one example of a hardware configuration of a cloud server of the embodiment.

FIG. 3 is a block diagram illustrating one example of a hardware configuration of the cloud server 40 of the present embodiment. As illustrated in FIG. 3, the cloud server 40 includes a control device 401, such as a CPU and a graphics processing unit (GPU), a main storage device 402, such as a ROM and a RAM, an auxiliary storage device 403, such as an HDD and a solid state drive (SSD), a display device 404, such as a display, an input device 405, such as a keyboard and a mouse, and a communication device 406, such as a communication interface, and has a hardware configuration using a general computer.

The control device 401 implements a function of managing an address book on the Internet by executing a program that is stored in a ROM of the main storage device 402 or the auxiliary storage device 403, using the RAM of the main storage device 402 as a work area.

Referring back to FIG. 1, the user terminal 20 is a terminal device to make various kinds of settings for the information processing apparatus 10, and can be, for example, a personal computer (PC) or a smart device, but is not limited thereto.

The mobile terminal 30 makes additional entry in an address book with respect to the cloud server 40, and can be a smart device or a mobile phone, but is not limited thereto.

As for hardware configurations, the user terminal 20 and the mobile terminal 30 can be implemented by a configuration similar to that of the cloud server 40.

Figure 4:
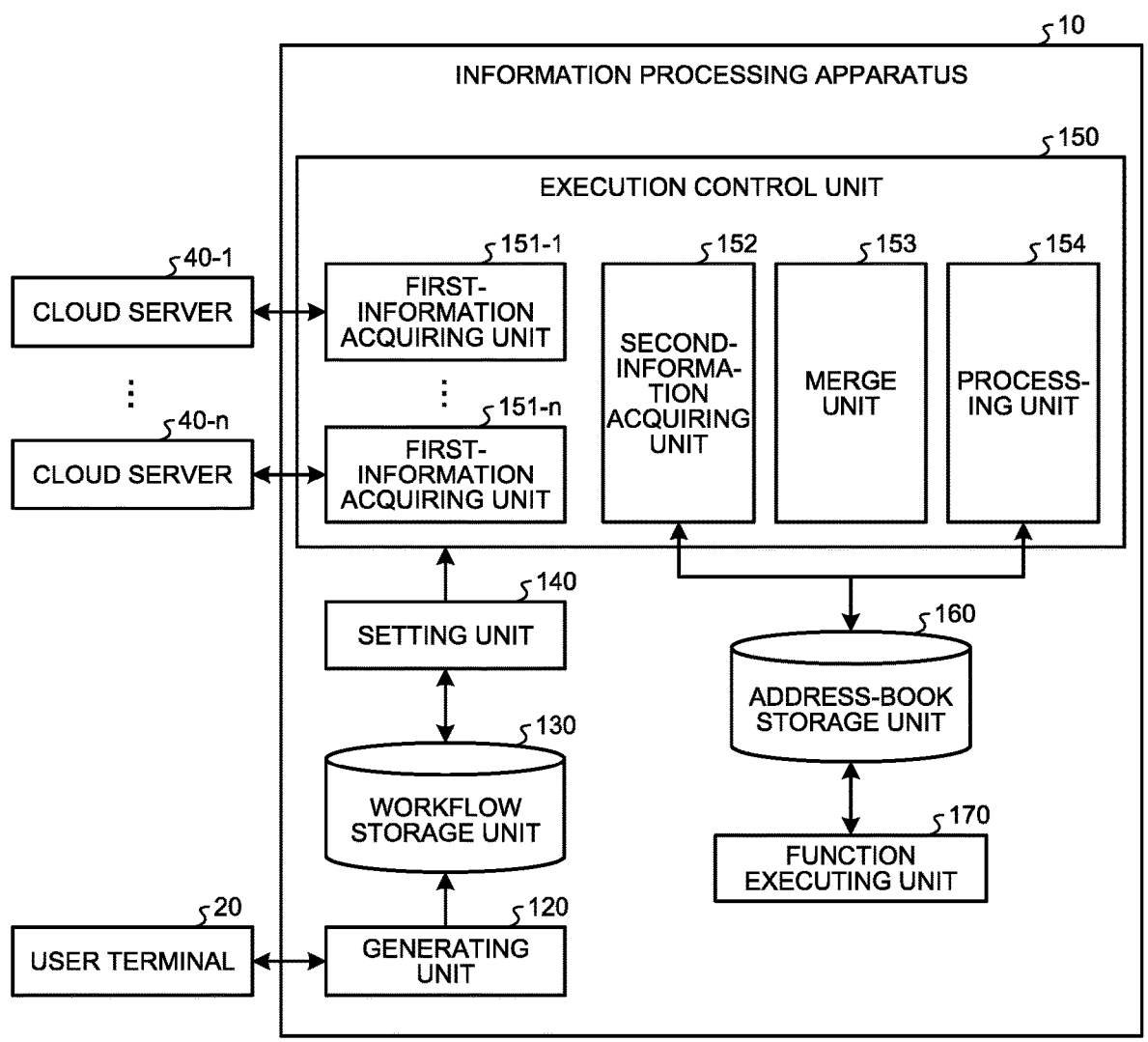
FIG. 4 is a block diagram illustrating one example of a functional configuration of an information processing apparatus of the embodiment.

FIG. 4 is a block diagram illustrating one example of a functional configuration of the information processing apparatus 10 of the present embodiment. As illustrated in FIG. 4, the information processing apparatus 10 includes a generating unit 120, a workflow storage unit 130, a setting unit 140, an execution control unit 150, an address-book storage unit 160, and a function executing unit 170. The generating unit 120, the setting unit 140, the execution control unit 150, and the function executing unit 170 can be implemented, for example, by the CPU 111, the RAM 113, the network I/F 108, and the like. The workflow storage unit 130 and the address-book storage unit 160 can be implemented, for example, by the HDD 115, the RAM 113, and the like.

The generating unit 120 generates workflow information in which one or more components to be executed and an execution sequence are defined, and stores it in the workflow storage unit 130. The components are componentized software (in component unit), and by combining multiple pieces of the components, software (application) that implements an intended function can be created. That is, in the workflow information, a combination of components that are necessary to implement an intended function and an execution sequence thereof are defined.

An entity of component is stored in the execution control unit 150 described later, and it is not necessary to include an entity of the component to be executed in the workflow information. The workflow information is only required to define at least one component to be executed and an execution sequence by using information to identify the component to be executed (for example, identification (ID) of the component to be executed).

Figure 5:
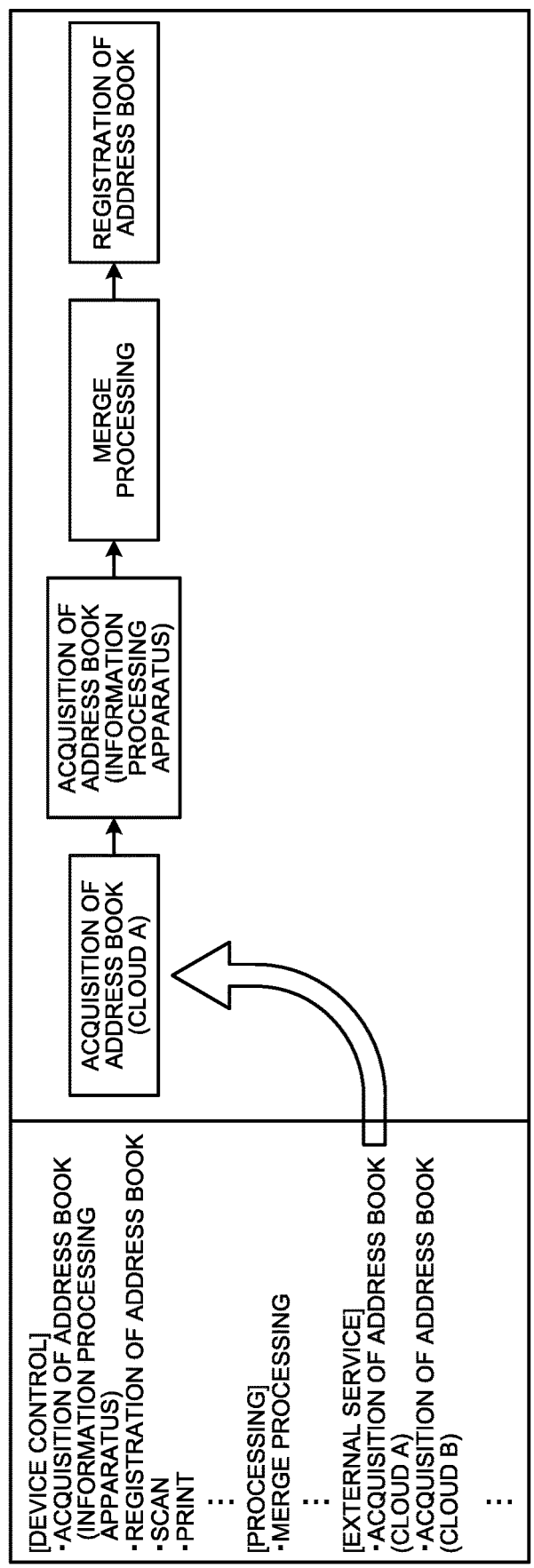
FIG. 5 illustrates one example of a workflow-information generating screen of the information processing apparatus of the embodiment.

The generating unit 120 generates a workflow-information generating screen as illustrated in FIG. 5, and generates workflow information based on operations input by a user. In the example illustrated in FIG. 5, a list of component information indicating components is displayed in a section on a left side of the screen, and a user selects (by drag and drop) component information of one or more components to be executed from the list of component information, and arranges them in order of execution in a section on a right side of the screen. Thus, the generating unit 120 generates workflow information. In this example, workflow information in which execution of four components of: acquisition of an address book from cloud A; acquisition of an address book from an information processing apparatus; merge of address books; and registration of a merged address book in this order is defined is generated.

In the present embodiment, it is assumed that the workflow-information generating screen is provided to the user terminal 20 as a web user interface (UI), and a user inputs operation to generate workflow information on the workflow-information generating screen displayed on the user terminal 20, but it is not limited thereto. For example, the workflow-information generating screen can be provided as a service on a cloud, or as a tool in the information processing apparatus 10.

The setting unit 140 sets, in the execution control unit 150, the workflow information that is generated by the generating unit 120 and stored in the workflow storage unit 130. In the present embodiment, although the case in which the workflow information generated by the generating unit 120 is stored is explained as an example, it is not limited thereto, and fixed workflow information (default workflow information) can be stored in advance.

The execution control unit 150 holds multiple kinds of components, and executes one or more components to be executed from among the held multiple kinds of components in the execution sequence based on the workflow information set by the setting unit 140.

In the following, a case in which an intended function to be executed based on the workflow information is a function of synchronizing address books managed by the cloud server 40 (in more detail, a function of merging an address book that is managed by the cloud server 40 with an address book that is managed by the information processing apparatus 10, and of updating the address book managed by the information processing apparatus 10) is explained as an example, but it is not limited thereto. Furthermore, a case in which workflow information set by the setting unit 140 is workflow information in which execution of four components of: acquisition of an address book from cloud A; acquisition of an address book from an information processing apparatus; merge of address books; and registration of a merged address book in this order is defined is explained as an example, but it is not limited thereto.

The execution control unit 150 holds, for example, respective components included in the list of component information explained in FIG. 5 as the multiple kinds of components. However, as the case in which the intended function to be executed based on the workflow information is a function of synchronizing address books managed by the cloud server 40 is explained as an example in the present embodiment as described above, FIG. 4 illustrates only first-information acquiring units 151-1 to 151-n, a second-information acquiring unit 152, a merge unit 153, and a processing unit 154.

The component of acquisition of an address book from cloud A defined in the workflow information corresponds to the first-information acquiring unit 151-1, the component of acquisition of an address book from in information processing apparatus corresponds to the second-information acquiring unit 152, the component of merge of address books corresponds to the merge unit 153, and the component of registration of a merged address book corresponds to the processing unit 154.

First, the execution control unit 150 executes the first-information acquiring unit 151-1 based on the workflow information (acquisition of an address book from cloud A) set by the setting unit 140. Thus, the first-information acquiring unit 151-1 acquires first information in a mode according to the cloud server 40-1 from the cloud server 40-1 that is the cloud server corresponding to the first-information acquiring unit 151-1, out of the cloud servers 40-1 to 40-n that manage the first information.

The first information is information relating to address books managed by the cloud server 40, and is constituted of multiple records. In detail, the first information is information that is constituted of address books of multiple people, and an address book of one person is structured as a record.

The first-information acquiring unit 151-1 is the component that is prepared to acquire the first information from the cloud server 40-1, and performs acquisition operation according to specifications (a data management format and an acquisition format (protocol)) of the cloud server 40-1. In the present embodiment, the first-information acquiring unit 151-1 performs the acquisition operation according to the specifications of the cloud server 40-1 by using (by requesting) a web application programming interface (API) provided by the cloud server 40-1, but it is not limited thereto.

FIG. 6 illustrates one example of an address book (record) of one person in the first information of the present embodiment. In the example illustrated in FIG. 6, the address book (record) of one person in the first information is constituted of id that is an identifier of a record, name indicating a name in Japanese Kanji, nameRoman indicating a name in Roman characters, phoneNum indicating a phone number, faxNum indicating a fax number, and email indicating an email address.

Although not executed by the execution control unit 150 since it is not defined in the workflow information in the present embodiment, the first-information acquiring units 151-2 to 151-$n$ can acquire the first information in a mode according to the corresponding cloud server 40 from the cloud servers 40-2 to 40-$n$ of a corresponding cloud, out of the cloud servers 40-2 to 40-$n$ that manage the first information, respectively.

As described, in the present embodiment, as an information acquisition component dedicated to the corresponding cloud server 40 is provided for each of the cloud servers 40, even if specifications, such as a data management format and an acquisition format (protocol) differ from each other among the cloud servers 40, they are supported. Especially in the present embodiment, because software is prepared per component, not per function, it is not necessary to develop software to implement a function of synchronizing address books for each of the cloud servers 40, but is only necessary to develop it to cover a different part (only an acquisition part for which specifications differ per cloud server 40). Therefore, while suppressing various kinds of costs, such as human costs and financial costs, it can be compatible with multiple cloud services that manage information with different specifications.

Subsequently, the execution control unit 150 executes the second-information acquiring unit 152 based on the workflow information (acquisition of an address book from an information processing apparatus) set by the setting unit 140. Thus, the second-information acquiring unit 152 acquires second information.

The second information is information relating to address books managed by the information processing apparatus 10, and is constituted of multiple records. In detail, the second information is information constituted of address books of multiple people, and an address book of one person is structured in a unit of record.

In the present embodiment, the second information is stored in the address-book storage unit 160, and the second-information acquiring unit 152 therefore acquires the second information from the address-book storage unit 160.

FIG. 7 illustrates one example of an address book (record) of one person in the second information of the present embodiment. In the example illustrated in FIG. 7, the address book (record) of one person in the second information is constituted of id that is an identifier of a record, name indicating a name in Japanese Kanji, phoneticName indicating a name in Roman characters, phoneNumber indicating a phone number, faxNum indicating a fax number, and mailAddress indicating an email address.

Subsequently, the execution control unit 150 executes the merge unit 153 based on the workflow information (merge of address books) set by the setting unit 140. Thus, the merge unit 153 merges the first information that is acquired by the first-information acquiring unit 151-1 out of the first-information acquiring units 151-1 to 151-$n$, and the second information that is acquired by the second-information acquiring unit 152. Specifically, the merge unit 153 merges at least one record that is not correspondent (consistent) with any of records included in the second information out of plural records included in the first information with the second information. Whether it is correspondent (consistent) can be determined based on whether mail addresses, names, phone numbers that are guaranteed to be unique data, or a combination of these are consistent with each other.

Moreover, as is obvious from FIG. 6 and FIG. 7, the information processing apparatus 10 and the cloud server 40 often manage the same element with different attributes (labels). For example, in the examples illustrated in FIG. 6 and FIG. 7, while name in Roman characters is managed with an attribute (label) of nameRoman in the cloud server 40, name in Roman characters is managed with an attribute (label) of phoneticName in the information processing apparatus 10.

Therefore, the merge unit 153 holds conversion information (table) as illustrated in FIG. 8, and converts, at the time of merging a record included in the first information with the second information, an attribute (label) of an element constituting the record into an attribute (label) of an element constituting a record included in the second information by using this conversion information to achieve the merge. The conversion information illustrated in FIG. 8 is information of correspondence indicating in what name (label) respective cloud servers manage an identical element. The conversion information (table) illustrated in FIG. 8 can be stored in a storage device, such as the HDD 115, in advance. Thus, even when a record included in the first information is merged with the second information, an attribute (label) of an element constituting a record included in the first embodiment can be associated with an attribute (label) of an element constituting a record included in the second information.

Although the case in which the merge unit 153 converts an attribute (label) of an element constituting a record included in the first information into an attribute (label) of an element constituting a record included in the second information by using the conversion information illustrated in FIG. 8 has been explained as an example in the present embodiment, it is not limited thereto, and conversion can be performed by the first-information acquiring units 151-1 to 151-$n$. In this case, each of the first-information acquiring units 151-1 to 151-$n$ can be configured to perform processing of converting an attribute (label) of an element constituting a record included in the first information is converted into an attribute (label) of an element constituting a record included in the second information when each of the first-information acquiring units 151 acquires the first information from the cloud server 40.

FIG. 9 illustrates one example of a merge result (merge information) of the present embodiment. In the example illustrated in FIG. 9, a merge result obtained by merging the first information (the address book managed by the cloud server 40-1) explained in FIG. 6 with the second information (the address book managed by the information processing apparatus 10) is illustrated.

Although the case in which the merge unit 153 merges at least one record that is not correspondent with any of records included in the second information out of multiple records included in the first information, that is, the case of merging in such a form that a new record is added without overwriting the records included in the second information, has been explained as an example in the present embodiment, forms of merge are not limited thereto. The merge can be achieved by overwriting the records included in the second information.

This kind of setting can be made on an address-book-synchronization setting screen as illustrated in FIG. 10. The address-book-synchronization setting screen illustrated in FIG. 10 is a screen to make settings relating to synchronization of address books, a synchronization timing for address books (manually or automatically), in what form the merge is performed (overwrite or not), and the like can be set.

Although it is assumed in the present embodiment that the address-book-synchronization setting screen is provided as a web user interface (UI) to the user terminal 20, and a user inputs operation to generate workflow information on the address-book-synchronization setting screen displayed on the user terminal 20, it is not limited thereto. For example, the address-book-synchronization setting screen can be provided as a service on a cloud, or can be provided as a tool in the information processing apparatus 10.

Subsequently, the execution control unit 150 executes the processing unit 154 based on the workflow information (registration of a merged address book) set by the setting unit 140. Thus, the processing unit 154 performs processing based on merge information in which the first information and the second information are merged by the merge unit 153. In the present embodiment, the merge information is information relating to a merged address book, and the processing unit 154 performs processing of registering the merge information in the address-book storage unit 160.

The function executing unit 170 performs a control to execute the functions of the information processing apparatus 10. The functions of the information processing apparatus 10 includes, for example, the printer function, the scanner function, the facsimile function, and a scan to Email function, but not limited thereto.

In the case of the printer function, the function executing unit 170 executes a print app, and thereby controls the paper feed table 105 and the print engine 106 to implement the printer function of printing an image on a sheet fed by the paper feed table 105. Furthermore, in the case of the scanner function, the function executing unit 170 executes a scan app, and thereby controls the ADF 101 and the scanner unit 102 to scan an original conveyed by the ADF 101 and acquire image data of the original.

Moreover, in the case of the facsimile function, the function executing unit 170 executes a facsimile app. The function executing unit 170 thereby displays information (the second information, the merge information) relating to an address book that is stored in the address-book storage unit 160 on the display panel 104, to have a user input a phone number of a destination of facsimile. The function executing unit 170 then controls the ADF 101 and the scanner unit 102 to scan an original conveyed by the ADF 101, acquires image data of the original, and transmits the image data to the destination input by the user by facsimile.

Furthermore, in the case of scan to Email function, the function executing unit 170 executes a scan to Email app. The function executing unit 170 thereby displays information (the second information, the merge information) relating to an address book stored in the address-book storage unit 160 on the display panel 104, to have a user input an email address of a destination of facsimile. The function executing unit 170 then controls the ADF 101 and the scanner unit 102 to scan an original conveyed by the ADF 101, acquires image data of the original, and transmits the image data to the destination input by the user by email.

Figure 11:
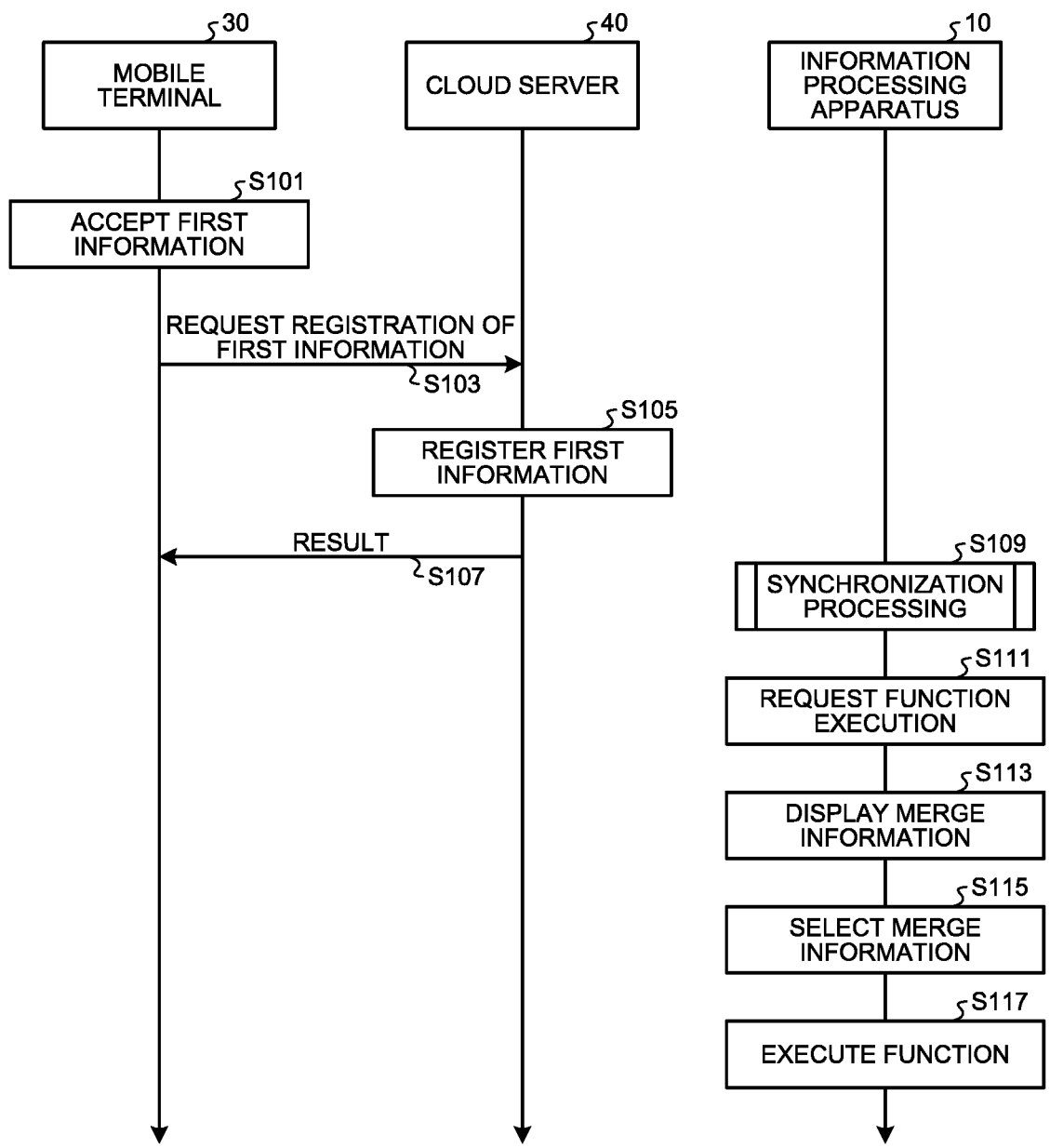
FIG. 11 is a sequence diagram illustrating one example of a flow of a procedure of processing of the embodiment.

FIG. 11 is a sequence diagram illustrating one example of a flow of a procedure of processing of the present embodiment. In the example illustrated in FIG. 11, a case in which the mobile terminal 30 registers the first information (information relating to an address book) in the cloud server 40, and the information processing apparatus 10 merges the first information (information relating to an address book) with the second information (information relating to an address book) that is managed by itself to use it is explained as an example, but it is not limited thereto.

First, the mobile terminal 30 accepts an input of the first information (information relating to an address book) to be registered in the cloud server 40 from a user (step S101), and sends a registration request to the cloud server 40 (step S103).

Subsequently, the cloud server 40 registers the first information (information relating to an address book) for which the registration request is issued by the mobile terminal 30 in the cloud server 40 (step S105), and informs the mobile terminal 30 of a registration result (step S107).

The processing from steps S101 to S105 can be performed by a user manually inputting the first information using a web browser or an application on the mobile terminal 30, or can be performed by the cloud server 40 by performing the optical character recognition (OCR) on an image of a business card or the like that is captured by the mobile terminal 30 to extract the first information.

Subsequently, the execution control unit 150 of the information processing apparatus 10 executes the synchronization processing when it is time to perform synchronization of address books (step S109). The synchronization timing of address books can be, as described above, set on the address-book-synchronization setting screen illustrated in FIG. 10. Details of the synchronization processing are described later.

Subsequently, the function executing unit 170 of the information processing apparatus 10 accepts an execution request from the user (step S111). In this example, as the accepted execution request is for the facsimile function, and therefore, a case in which the function executing unit 170 executes the facsimile app is explained as an example, but it is not limited thereto.

Subsequently, the function executing unit 170 of the information processing apparatus 10 displays the merge information (information relating to an address book) that is stored in the address-book storage unit 160 on the display panel 104 (step S113), and has the user input a phone number of a destination of facsimile by selecting merge information (step S115). When receiving the execution request from the user, the function executing unit 170 controls the ADF 101 and the scanner unit 102 to scan an original conveyed by the ADF 101, acquires image data of the original, and transmits the image data to the destination input by the user by facsimile (step S117).

Figure 12:
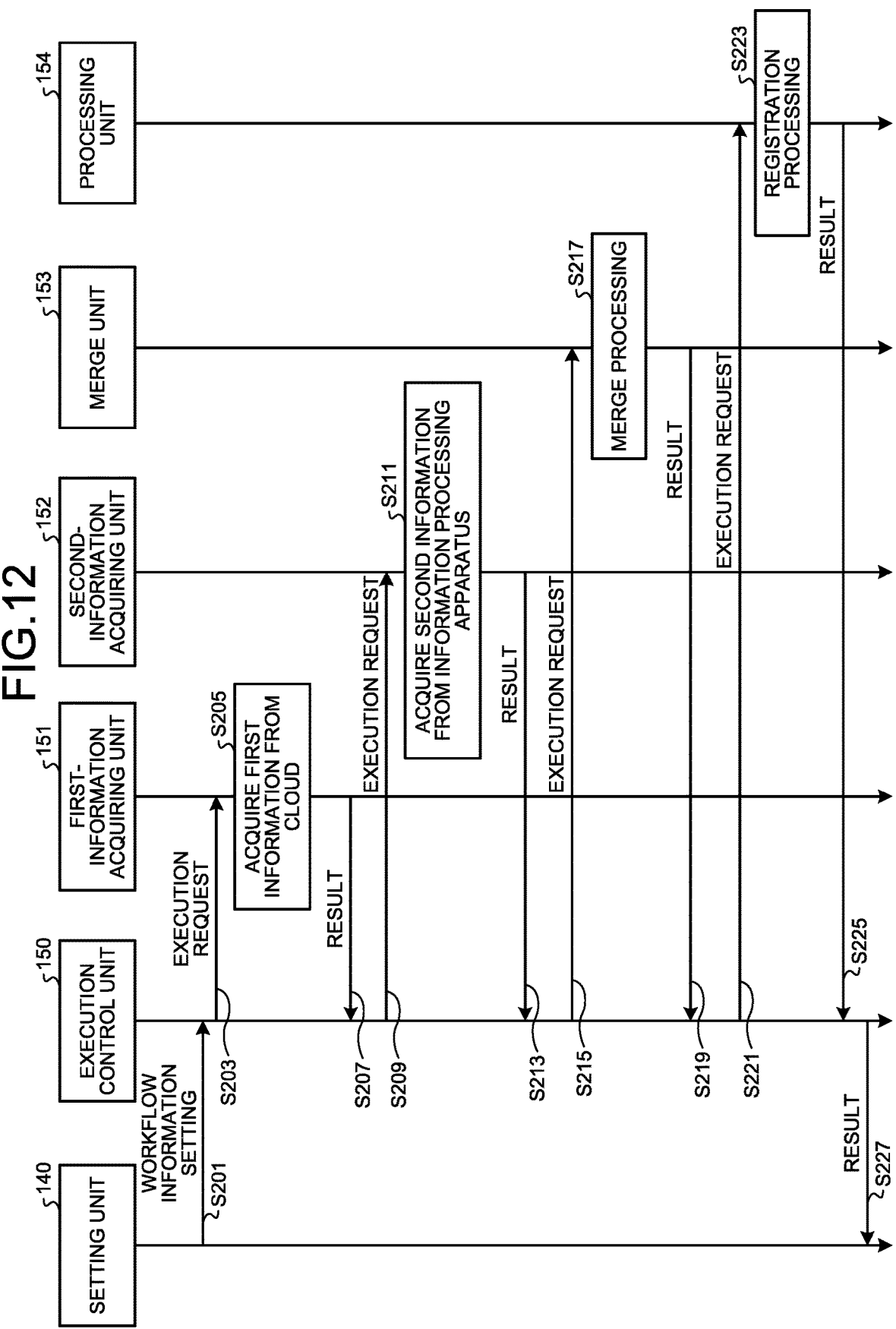
FIG. 12 is a sequence diagram illustrating one example of a flow of a procedure of synchronization processing of the embodiment.

FIG. 12 is a sequence diagram illustrating one example of a flow of a procedure of synchronization processing of the present embodiment.

First, the setting unit 140 sets workflow information stored in the workflow storage unit 130 to the execution control unit 150 (step S201).

Subsequently, the execution control unit 150 sends an execution request to the first-information acquiring unit 151-1 based on the workflow information (acquisition of an address book from cloud A) set by the setting unit 140 (step S203).

Thus, the first-information acquiring unit 151-1 acquires first information (information relating to an address book) in a mode according to the cloud server 40-1 from the cloud server 40-1 that is the cloud server corresponding to the first-information acquiring unit 151-1, out of the cloud servers 40-1 to 40-$n$ that manage the first information (step S205), and informs the execution control unit 150 of an acquisition result (step S207).

Subsequently, the execution control unit 150 sends an execution request to the second-information acquiring unit 152 based on the workflow information (acquisition of an address book from an information processing apparatus) set by the setting unit 140 (step S209).

Thus, the second-information acquiring unit 152 acquires the second information (information relating to an address book) from the address-book storage unit 160 (step S211), and informs the execution control unit 150 of an acquisition result (step S213).

Subsequently, the execution control unit 150 sends an execution request to the merge unit 153 based on the workflow information (merge of address books) set by the setting unit 140 (step S215).

Thus, the merge unit 153 merges at least one record that is not correspondent with any of records included in the second information out of plural records included in the first information with the second information (step S217), and informs the execution control unit 150 of a merge result (step S219). Details of the merge processing are described later.

Subsequently, the execution control unit 150 sends an execution request to the processing unit 154 based on the workflow information (registration of a merged address book) set by the setting unit 140 (step S221).

Thus, the processing unit 154 performs processing of registering merge information (information relating to a merged address book) obtained by merging the first information and the second information by the merge unit 153 in the address-book storage unit 160 (step S223), and informs the execution control unit 150 of a merge result (step S225).

Figure 13:
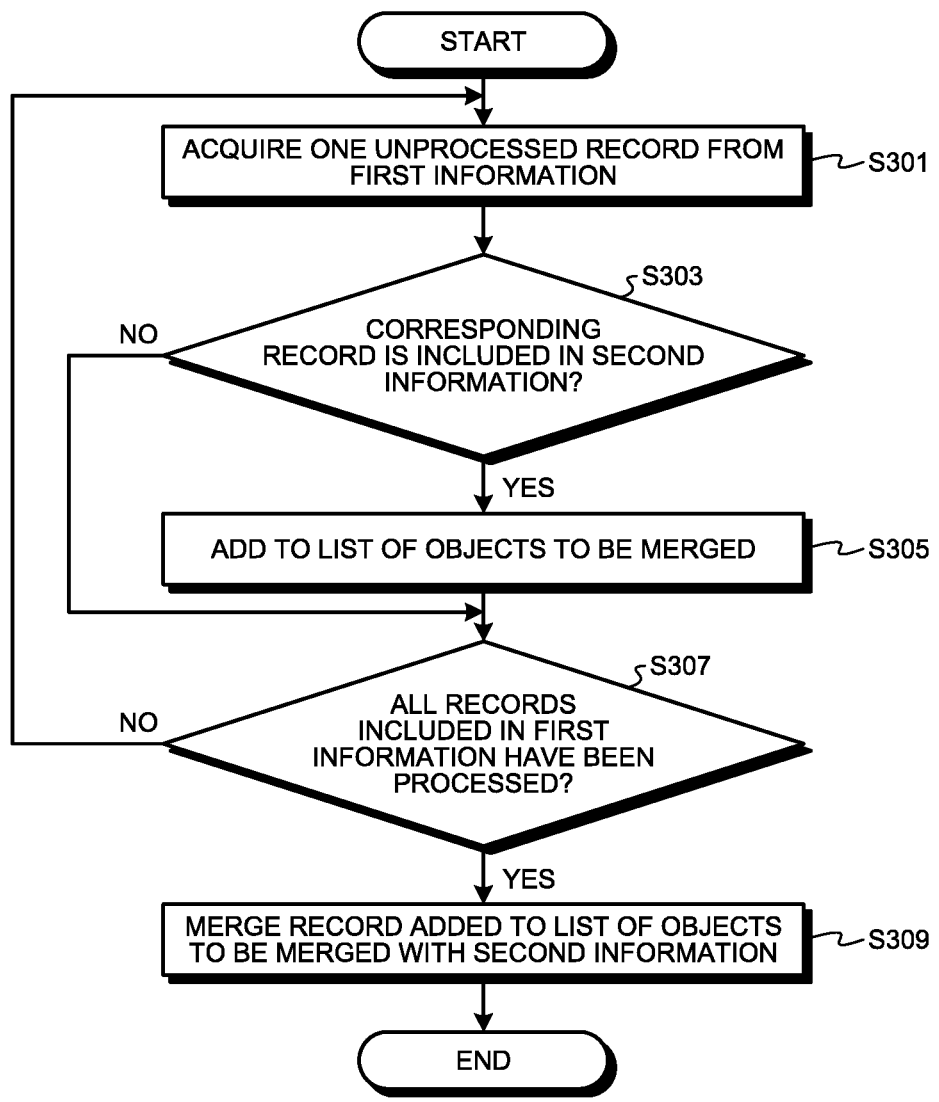
FIG. 13 is flowchart illustrating one example of a flow of a procedure of merge processing of the embodiment.

FIG. 13 is a flowchart illustrating one example of a flow of a procedure of the merge processing of the present embodiment. In the example illustrated in FIG. 13, a case of merge by adding a new record without overwriting records included in the second information is explained as an example, but it is not limited thereto.

First, the merge unit 153 acquires an unprocessed record from the first information (information relating to an address book) acquired by the first-information acquiring unit 151-1 (step S301).

Subsequently, the merge unit 153 determines whether a record corresponding to the acquired record is included in the second information acquired by the second-information acquiring unit 152 (step S303). The determination can be done based on whether mail addresses, names, phone numbers that are guaranteed to be unique data, or a combination of these are consistent with each other as described above.

When it is included (step S303: YES), the merge unit 153 converts an attribute (label) of an element constituting the record into an attribute (label) of an element constituting the record included in the second information by using the conversion information illustrated in FIG. 8 described above, and adds the record to a list of objects to be merged (step S305), and when it is not included (step S303: NO), the merge unit 153 does not perform the processing at step S305.

Subsequently, the merge unit 153 repeats the processing at steps S301 to S305 until all records included in the first information are processed (step S307: NO). When all records included in the first information are processed (step S307: YES), the merge unit 153 merges (adds) the record added to the list of objects to be merged with the second information (step S309).

As described above, as information acquisition component dedicated to the cloud server 40 is provided for each of the cloud servers 40 in the present embodiment, it supports the case in which specifications such as a data management format and an acquisition format (protocol) differ from each other among the cloud servers 40. Especially in the present embodiment, because software is prepared per component, not per function, it is not necessary to develop software to implement a function of synchronizing address books for each of the cloud servers 40, but only necessary to develop it to cover a different part (only an acquisition part for which specifications differ per cloud server 40). Therefore, while suppressing various kinds of costs, such as human costs and financial costs, it can be compatible with multiple cloud services that manage information with different specifications.

For example, when changing the cloud server 40 that manages an address book used for synchronization, the user can generate workflow information by selecting, on the workflow-information generating screen in FIG. 5 described above, a component that performs acquisition of an address book from the cloud server 40 thus changed.

Moreover, according to the present embodiment, it is possible to perform a function using an address book that is registered from the mobile terminal 30, such as a smart device.

Furthermore, according to the present embodiment, as an address book managed by the cloud server 40 is synchronized with an address book of the information processing apparatus 10 to perform a function, it is possible to perform a function using an address book managed by the cloud server 40 even when network connection is not available.

First Modification

In the above embodiment, the merge unit 153 can merge at least one record that is not correspondent with any of records included in the second information out of multiple records included in the first information with the second information in descending order of update date.

Generally, the number of records of address book that can be registered in the information processing apparatus 10 is not so large. Therefore, if all address books that are not managed in the information processing apparatus 10 out of address books (first information) managed by the cloud server 40 are tried to be merged with the address books (second information) managed by the information processing apparatus 10, it often reaches the upper limit halfway. Therefore, by merging with the second information in descending order of update date as described above, it is possible to merge a record with higher priority (record updated recently) with the address books (second information) managed by the information processing apparatus 10 preferentially.

In this case, at least a record of the first information is structured including lastAccessDate indicating the latest update date as illustrated in FIG. 14. The attribute of the latest update date can be used as it is if it is already included in a record of the first information from a stage of being managed by the cloud server 40, and if it is not yet included in a record of the first information at the stage of being managed by the cloud server 40, the attribute can be added by the information processing apparatus 10. Moreover, the attribute of the latest update date can be included in a record of the second information also. In this case, the latest update date updated when it is used by the function executing unit 170.

Figure 15:
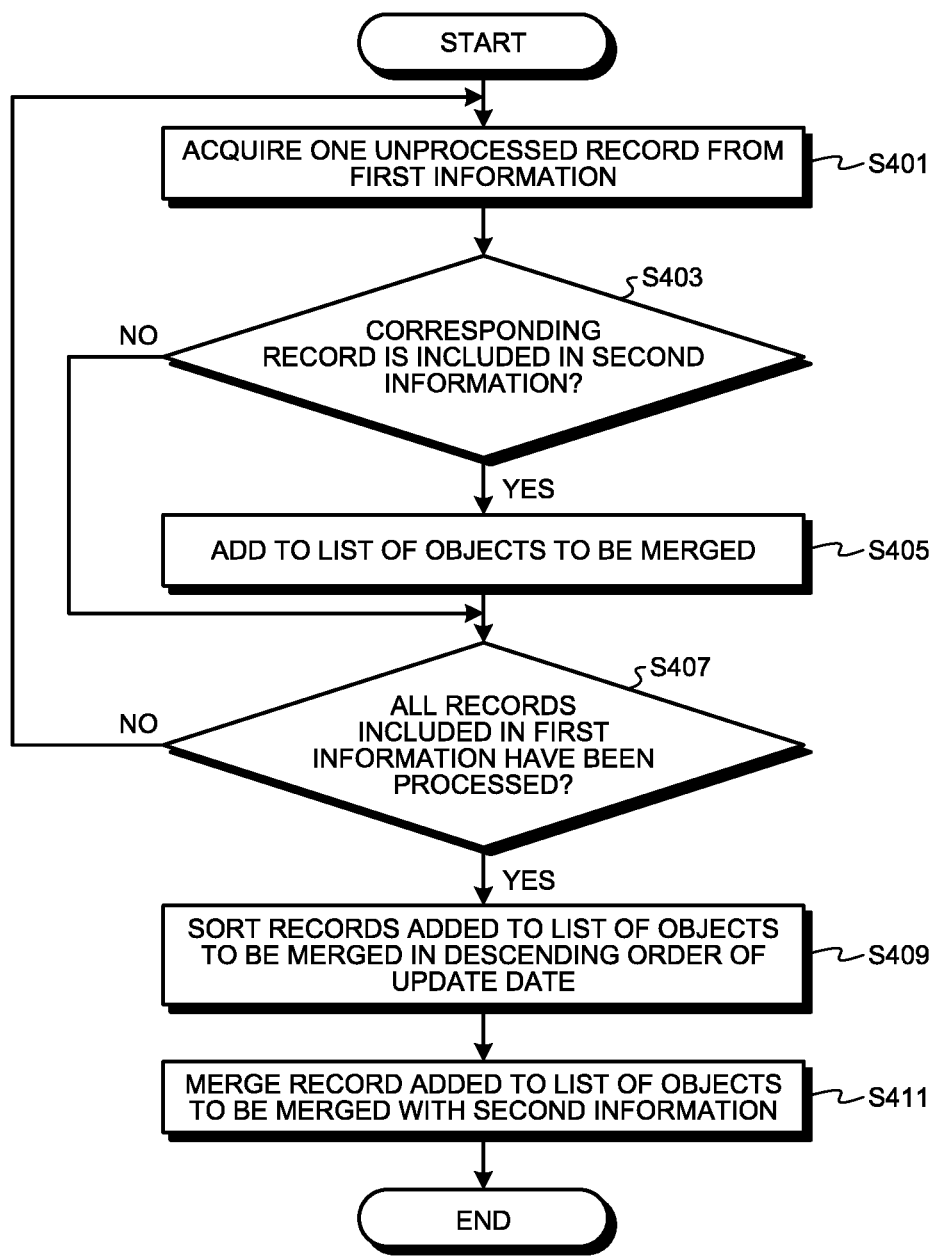
FIG. 15 is a flowchart illustrating one example of a flow of a procedure of merge processing of the first modification.

FIG. 15 is a flowchart illustrating one example of a flow of a procedure of the merge processing of the first modification. First, the processing at step S401 to step S407 are the same as the processing at step S301 to step S307 illustrated in FIG. 13.

Subsequently, when all records included in the first information are processed (step S407: YES), the merge unit 153 sorts records that are added to a list of objects to be merged in descending order of update date (step S409), and merges (adds) them with the second information in descending order of update date (step S411).

Second Modification

Although the synchronization of address books has been explained as an example in the above embodiment, objects to be synchronized are not limited to address books but, for example, it is also applied to bibliographic information or the like. Furthermore, the workflow explained in the above embodiment is not limited to the synchronization processing of address books, but is also applicable to a workflow of backing up address books managed on a cloud in a local server, such as an intra-company server, as comma-separated values (CSV) data.

Third Modification

Moreover, although the case in which the merge unit 153 is implemented by one kind of component by using the conversion information as illustrated in FIG. 8 has been explained in the above embodiment, the merge unit 153 (component) can be provided per combination (type of the cloud server 40) of the first information and the second information. Thus, the conversion information as illustrated in FIG. 8 becomes unnecessary.

Fourth Modification

For example, the first information described above can be a shared address book that can be viewed by all users, or a personal address book that can be viewed only by specific users. In the following explanation, a term "first-information acquiring unit 151" can be used when the first-information acquiring units 151-1 to 151-*n* are not distinguished from each other.

In the present modification, the first-information acquiring unit 151 acquires a shared address book from the corresponding cloud server 40 periodically. Moreover, the first-information acquiring unit 151 acquires, after authentication of a user, a personal address book from the corresponding cloud server 40 by using account information to identify the user.

When the shared address book is acquired by the first-information acquiring unit 151, the merge unit 153 merges the shared address book with the second information acquired by the second-information acquiring unit 152, which is a shared address book managed by the information processing apparatus 10, and the processing unit 154 performs processing of registering merge information, which is the merged address book.

Furthermore, when the personal address book is acquired by the first-information acquiring unit 151, the merge unit 153 merges the personal address book with the second information acquired by the second-information acquiring unit 152, which is a personal address book managed by the information processing apparatus 10, and the processing unit 154 performs processing of registering merge information, which is the merged address book.

Moreover, the first-information acquiring unit 151 acquires a personal address book when predetermined time passes after the synchronization processing of updating the personal address book that is managed by the information processing apparatus 10 is completed by merging the personal address book managed by the information processing apparatus 10 with a personal address book that is acquired from the cloud server 40 after authentication of the user. That is, only when predetermined time period has passed since completion of the synchronization processing of address books, synchronization of a next personal address is performed. Specific explanation of the present modification is given below.

Although basic configurations of the respective devices are the same as those of the above embodiment, the address-book storage unit 16 of the present modification has a storage region in which the shared address book is stored and a region in which the personal address book is stored. Furthermore, the cloud server 40 manages the shared address book and the personal address book. As illustrated in FIG. 16, the cloud server 40 manages (stores) an address book (in this example, it is constituted of name, nameRoman, phoneNum, faxNum, and email), a type to identify whether it is a shared address or a personal address, and account information to identify the user having authority to access the personal address book in an associated manner per id that is an identifier of a record (address book).

Figure 17:
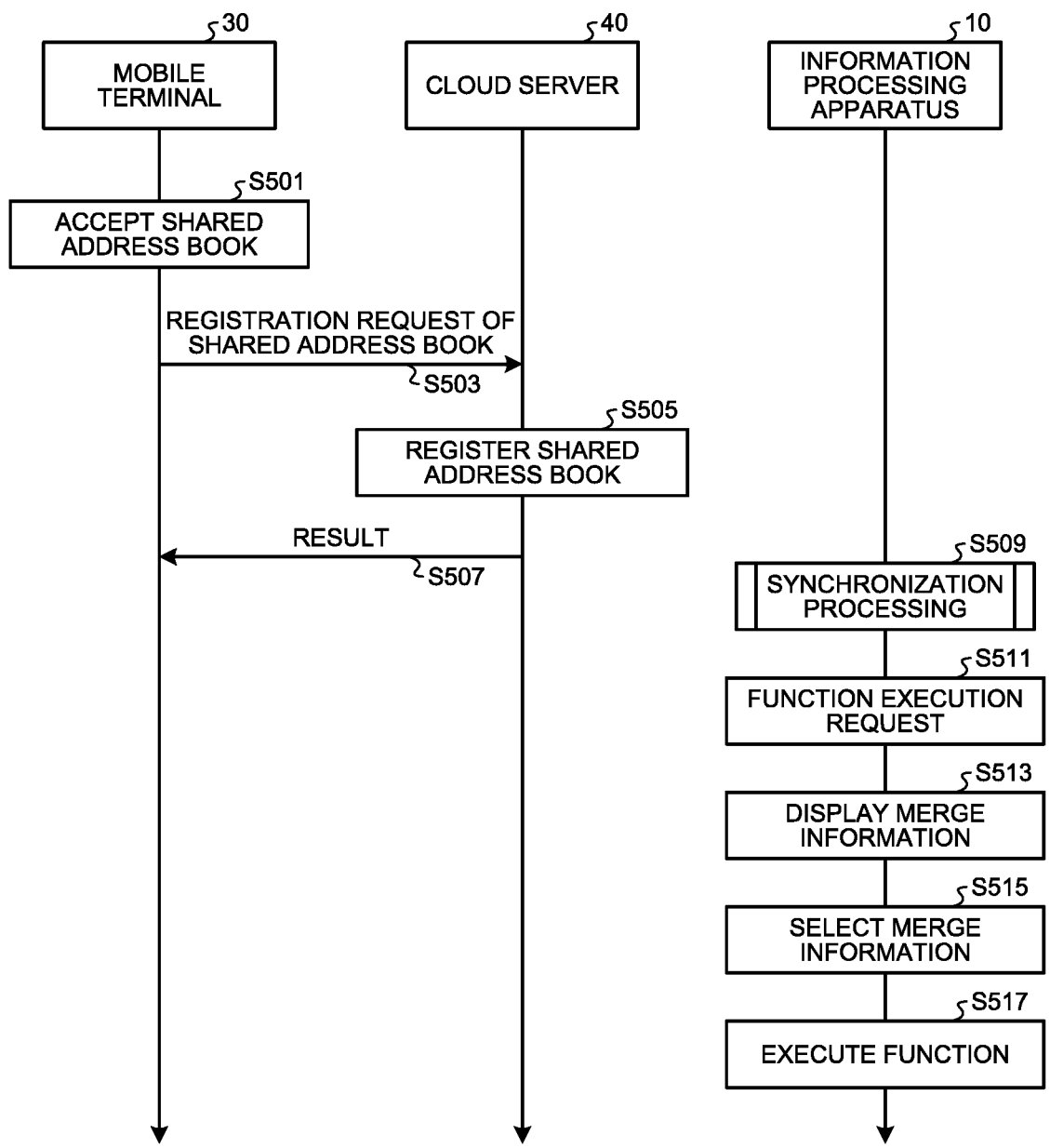
FIG. 17 is a sequence diagram illustrating one example of an operation procedure of an information processing system of a modification.

FIG. 17 is a sequence diagram illustrating one example of an operation procedure of the information processing system 1 when the mobile terminal 30 registers a shared address book in the cloud server 40, the information processing apparatus 10 acquires the shared address book from the cloud server 40, and merges the acquired shared address book with the second information, which is a shared address book managed by itself, to use it.

First, the mobile terminal 30 accepts an input of a shared address book to be registered in the cloud server 40 from a user (step S501), and sends a registration request to the cloud server 40 (step S503).

Subsequently, the cloud server 40 registers the shared address book for which the registration request is issued by the mobile terminal 30 in the cloud server 40 (step S505), and informs the mobile terminal 30 of a registration result (step S507).

The processing at steps S501 to S505 can be performed by a user manually inputting a shared address book using a web browser or an application on the mobile terminal 30, or can be performed by the cloud server 40 by performing the OCR on an image of a business card or the like that is captured by the mobile terminal 30 to extract the first information.

Subsequently, the execution control unit 150 of the information processing apparatus 10 performs synchronization processing of the shared address book when it is time to perform the synchronization processing of shared addresses (step S509). The synchronization timing of address books can be, as described above, set on the address-book-synchronization setting screen illustrated in FIG. 10. Details of the synchronization processing of shared address books are described later.

Subsequently, the function executing unit 170 of the information processing apparatus 10 accepts a function execution request from a user (step S511). In this example, the accepted execution request is for the facsimile function, and therefore, a case in which the function executing unit 170 executes the facsimile app is explained as an example, but it is not limited thereto.

Subsequently, the function executing unit 170 of the information processing apparatus 10 displays the merge information (information relating to an address book) that is stored in the address-book storage unit 160 on the display panel 104 (step S513), and has the user input a phone number of a destination of facsimile by selecting merge information (step S515). When receiving the execution request for transmission from the user, the function executing unit 170 controls the ADF 101 and the scanner unit 102 to scan an original conveyed by the ADF 101, acquires image data of the original, and transmits the image data to the destination input by the user by facsimile (step S517).

Figure 18:
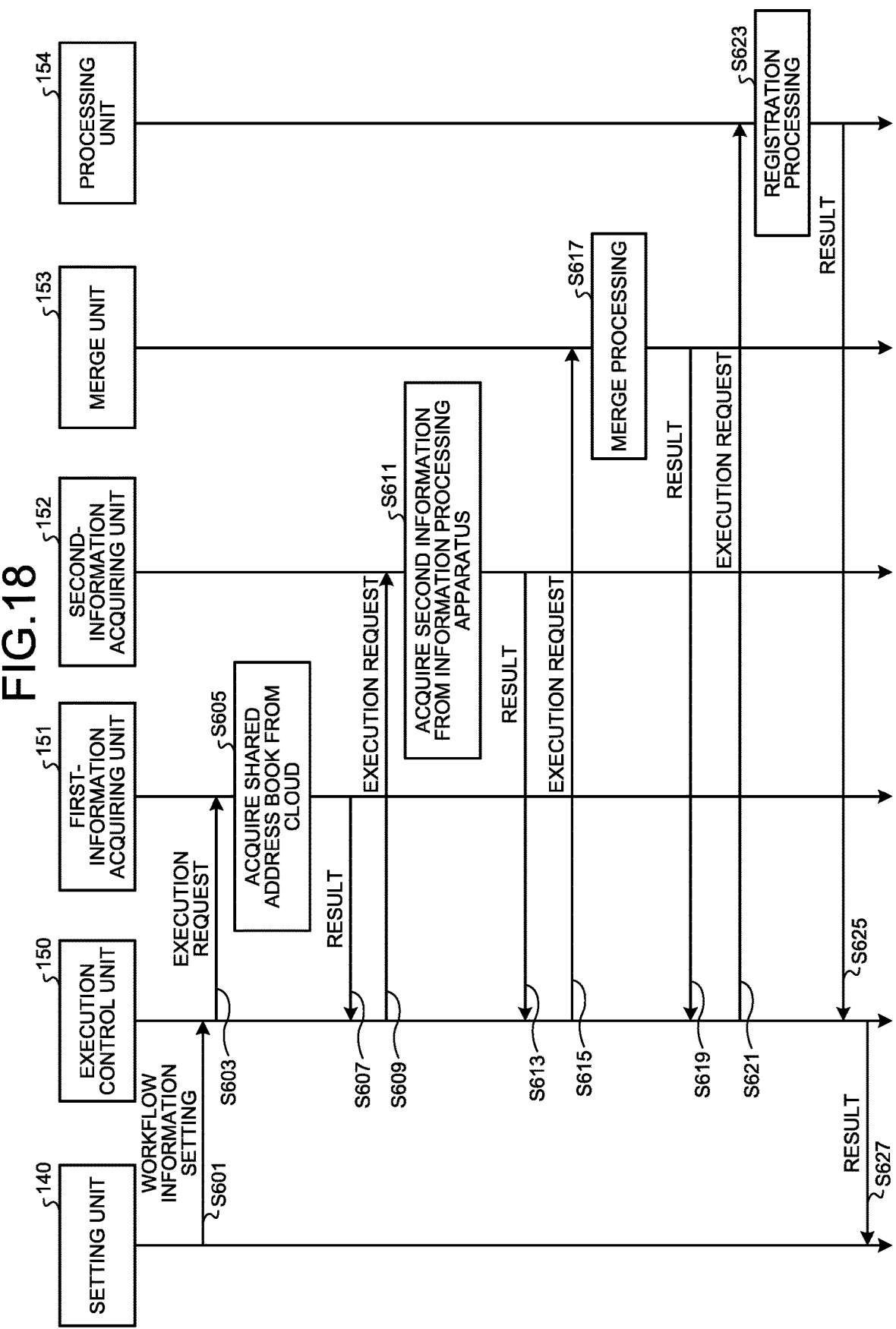
FIG. 18 is a sequence diagram illustrating one example of a flow of a procedure of synchronization processing of shared address books of the modification.

FIG. 18 is a sequence diagram illustrating one example of a flow of a procedure of synchronization processing (step S509 in FIG. 17) of shared address books of a present modification.

Figure 19:
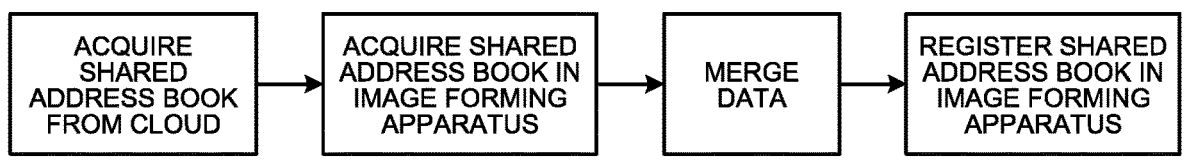
FIG. 19 illustrates one example of a workflow that is indicated in workflow information of the synchronization processing of shared address books of the modification.

First, the setting unit 140 sets workflow information of the synchronization processing of shared address books stored in the workflow storage unit 130 (step S601). FIG. 19 illustrates one example of a workflow that is indicated in the workflow information of this case.

Subsequently, the execution control unit 150 sends an execution request to the first-information acquiring unit 151 based on the workflow information (refer to FIG. 19) set by the setting unit 140 (step S603).

Thus, the first-information acquiring unit 151 acquires the shared address book from the corresponding cloud server 40 (step S605), and informs the execution control unit 150 of an acquisition result (step S607).

Subsequently, the execution control unit 150 sends an execution request to the second-information acquiring unit 152 based on the workflow information (refer to FIG. 19) set by the setting unit 140 (step S609).

Thus, the second-information acquiring unit 152 acquires the second information (shared address book that is managed by the information processing apparatus 10) from the address-book storage unit 160 (step S611), and informs the execution control unit 150 of an acquisition result (step S613).

Subsequently, the execution control unit 150 sends an execution request to the merge unit 153 based on the workflow information (refer to FIG. 19) set by the setting unit 140 (step S615).

The merge unit 153 merges, when the shared address book acquired from the cloud server 40 is not present in the shared address book managed by the information processing apparatus 10, the shared address book acquired from the cloud server 40 with the shared address book that is managed by the information processing apparatus 10 (step S617), and informs the execution control unit 150 of a merge result (step S619).

Subsequently, the execution control unit 150 sends an execution request to the processing unit 154 based on the workflow information (refer to FIG. 19) set by the setting unit 140 (step S621).

Thus, the processing unit 154 performs processing of registering merge information obtained by merging by the merge unit 153 in the address-book storage unit 160 (step S623), and informs the execution control unit 150 of a merge result (step S625).

Figure 20:
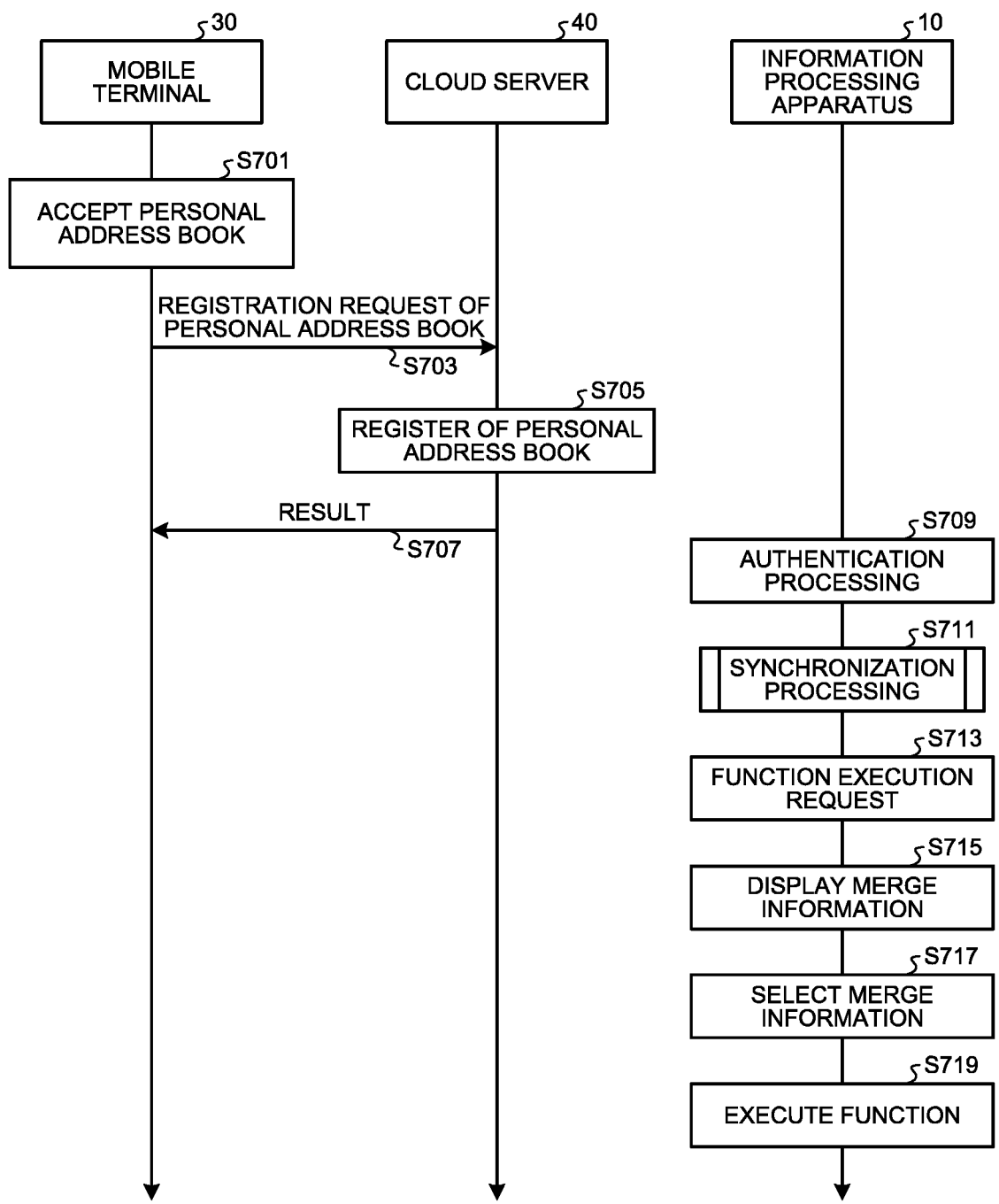
FIG. 20 is a sequence diagram illustrating one example of an operation procedure of the information processing system of the modification.

FIG. 20 is a sequence diagram illustrating one example of an operation procedure of the information processing system 1 when the mobile terminal 30 registers a personal address book in the cloud server 40, the information processing apparatus 10 acquires the personal address book from the cloud server 40, and merges the acquired personal address book with the second information, which is a personal address book managed by itself, to use it.

First, the mobile terminal 30 accepts an input of a personal address book to be registered in the cloud server 40 from a user (step S701), and sends a registration request to the cloud server 40 (step S703). For example, when it is possible to select between "share/not share" at the time of registration of an address book, the user can select "not share" and register it.

Subsequently, the cloud server 40 registers the personal address book for which the registration request is issued by the mobile terminal 30 in the cloud server 40 (step S705), and informs the mobile terminal 30 of a registration result (step S707). In this example, when registering the personal address book, the cloud server 40 registers the personal address book in association with an account that is used at the time of access from the mobile terminal 30.

The processing at steps S701 to S705 can be performed by a user manually inputting a personal address book using a web browser or an application on the mobile terminal 30, or can be performed by the cloud server 40 by performing the OCR on an image of a business card or the like that is captured by the mobile terminal 30 to extract the first information.

Subsequently, the information processing apparatus 10 performs authentication processing of a user (step S709). The authentication processing is processing to determine whether a user has authority to use the information processing apparatus 10. For example, the information processing apparatus 10 registers account information (only an account in this example, but it can be a combination of an account and a password, for example) in advance, and the user is determined to have authority (the user is authorized) to use the information processing apparatus 10 only when account information input by the user matches with the account information registered in advance.

After the user is authenticated, the execution control unit 150 of the information processing apparatus 10 performs synchronization processing of personal address books (step S711). Details of the synchronization processing of personal address books are described later. As for the account information to acquire a personal address book from the cloud server 40 at the time of synchronization processing (account information that is associated with an address book managed by the cloud server 40), the account information of a user that is logged in to the information processing apparatus 10 is used. When the account information for an information processing apparatus and the account information for a cloud server are the same, the account information for the information processing apparatus used for the authentication processing described above can be used as it is. When they are different, for example, the information processing apparatus 10 manages account information for an information processing apparatus (only an account in this example) in association with account information for a cloud server (a combination of an account and a password in this example) as illustrated in FIG. 21, and can use account information for a cloud server that is associated with account information of an authenticated user (login account information).

Processing at step S713 to step S719 are the same as the processing at step S511 to step S517 in FIG. 17.

Figure 22:
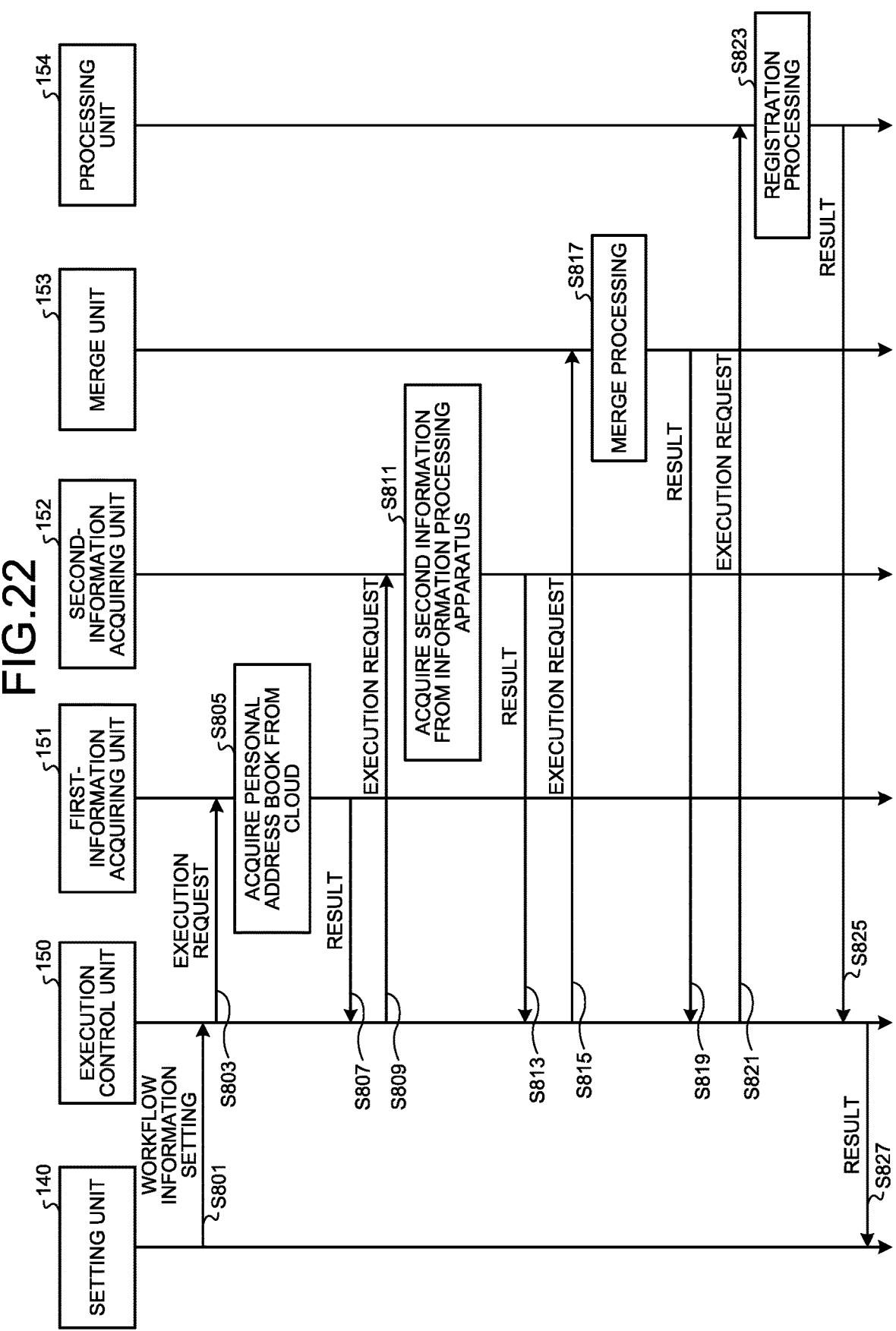
FIG. 22 is a sequence diagram illustrating one example of a flow of a procedure of the synchronization processing of personal address books of the modification.

FIG. 22 is a sequence diagram illustrating one example of a flow of a procedure of the synchronization processing (step S711 in FIG. 20) of personal address books of the present modification.

Figure 23:
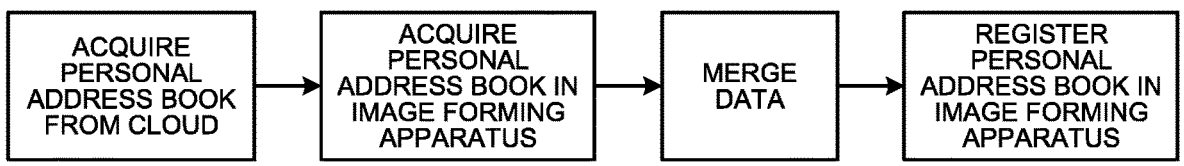
FIG. 23 illustrates one example of a workflow that is indicated in the workflow information of the synchronization processing of the personal address book of the modification.

First, the setting unit 140 sets workflow information of the synchronization processing of personal address books stored in the workflow storage unit 130 (step S801). FIG. 23 illustrates one example of a workflow that is indicated in the workflow information of this case.

Subsequently, the execution control unit 150 sends an execution request to the first-information acquiring unit 151 based on the workflow information (refer to FIG. 23) set by the setting unit 140 (step S803).

Thus, the first-information acquiring unit 151 acquires a personal address book that is associated with account information to identify a user that is logged in from the corresponding cloud server 40 (step S805), and informs the execution control unit 150 of an acquisition result (step S807).

Subsequently, the execution control unit 150 sends an execution request to the second-information acquiring unit 152 based on the workflow information (refer to FIG. 23) set by the setting unit 140 (step S809).

Thus, the second-information acquiring unit 152 acquires the second information (personal address book that is managed by the information processing apparatus 10) from the address-book storage unit 160 (step S811), and informs the execution control unit 150 of an acquisition result (step S813).

Subsequently, the execution control unit 150 sends an execution request to the merge unit 153 based on the workflow information (refer to FIG. 23) set by the setting unit 140 (step S815).

The merge unit 153 merges, when the personal address book acquired from the cloud server 40 is not present in the personal address book managed by the information processing apparatus 10, the personal address book acquired from the cloud server 40 with the personal address book that is managed by the information processing apparatus 10 (step S817), and informs the execution control unit 150 of a merge result (step S819).

Subsequently, the execution control unit 150 sends an execution request to the processing unit 154 based on the workflow information (refer to FIG. 23) set by the setting unit 140 (step S821).

Thus, the processing unit 154 performs processing of registering merge information obtained by merging by the merge unit 153 in the address-book storage unit 160 (step S823), and informs the execution control unit 150 of a merge result (step S825).

Figure 24:
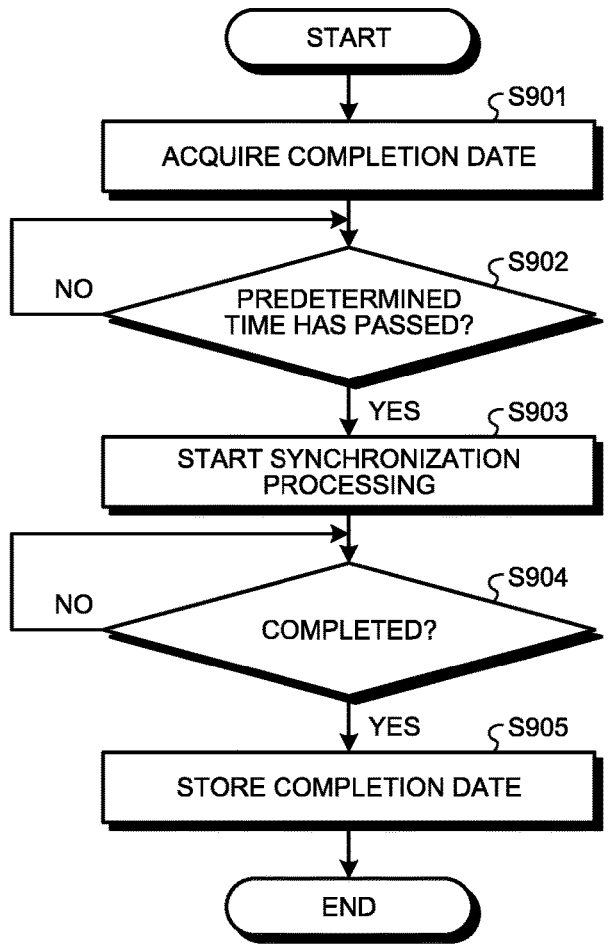
FIG. 24 is a flowchart illustrating an operation example of an execution control unit of the modification.

Moreover, in the present modification, there considered to be a case of performing the synchronization processing even though a personal address book is just acquired previously when the synchronization processing of personal address books is performed when an application is used after a user logs in. In this case, heavy processing is performed even though there is few change to be made in the personal address book for which the synchronization processing has been completed, causing a problem that the load on the system increases. To solve this problem in the present modification, it is arranged such that a completion date is stored in a storage device, such as the HDD 115, upon completion of the synchronization processing of personal address books, and the synchronization processing is performed only when predetermine time has passed. FIG. 24 illustrates a flow of this processing.

As illustrated in FIG. 24, after a user logs in, the execution control unit 150 acquires a completion date of the synchronization processing of personal address books from the storage device (step S901). Next, the execution control unit 150 checks whether predetermined time has passed (step S902). When a result of step S902 is a positive result (step S902: YES), the execution control unit 150 performs the synchronization processing (step S903). This processing is as described above. When the synchronization processing is completed (step S904: YES), the execution control unit 150 controls to store the completion date in the storage device (step S905).

In the present modification above, after a user is authenticated by the information processing apparatus 10, the synchronization processing of personal address books is performed by using account information of the authenticated user. That is, according to the present modification, the information processing apparatus 10 that can synchronize not only shared address books accessible for all users, but also personal address books accessible only by using account information of a specific user can be provided.

Program

The program that is executed by the information processing apparatus 10 of the embodiment and the modifications described above is recorded in a computer-readable recording medium, such as a compact disk (CD)-ROM, a CD-recordable (CD-R), a memory card, a digital versatile disk (DVD), a flexible disk (FD), in a file in a format enabling to be installed or executed therein to be provided.

Furthermore, the program that is executed by the information processing apparatus 10 of the embodiment and the modifications described above can be stored in a computer connected to a network such as the Internet, and be provided by being downloaded through the network. Moreover, the program that is executed by the information processing apparatus 10 of the embodiment and the modifications described above can be provided or distributed through the network, such as the Internet. Furthermore, the program executed by the information processing apparatus 10 of the embodiment and the modifications described above can be installed in a ROM, or the like in advance to be provided.

The program that is executed by the information processing apparatus 10 of the embodiment and the modifications described above has a module structure to implement the respective components described above on a computer. As actual hardware, for example, by reading the program from a ROM onto a RAM to execute it by a CPU, the respective functional units are implemented on a computer.

According to the present invention, linkage with multiple cloud services that manage information in different formats is enabled while suppressing costs is produced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
processing circuitry configured to
acquire, from a corresponding cloud among a plurality of clouds that manage first information, the first information in a mode according to the cloud;
acquire second information;
merge the first information with the second information; and
perform processing based on merge information that is obtained by merging the first information and the second information, wherein the first information and the second information are information relating to an address book, the merge information is information relating to a merged address book obtained after merge,
wherein the first information is constituted of a plurality of records which each have a label to describe each type of record,
the second information is constituted of a plurality of records which each have a label to describe each type of record, and
the processing circuitry merges at least one record included in the first information that has a differing label that is not the same as any of the labels included in the second information, where the at least one record of the first information is of a same type of at least one record included in the second information, by converting the differing label to match a label used in the second information for the same type based on a pre-stored conversion information which indicates labels used by each of the respective cloud servers to manage an identical type of element, wherein when at least one other record included in the first information is of a different type than each record included in the second information, the processing circuitry does not include the at least one other record as an object to be merged with the second information into the address book.

2. The information processing apparatus according to claim 1, wherein
the processing circuitry merges at least one record that is not correspondent with any of the records included in the second information out of the records included in the first information with the second information in descending order of update date.

3. The information processing apparatus according to claim 1, wherein
the processing circuitry performs processing of registering the merge information.

4. The information processing apparatus according to claim 3, wherein
the first information is any one of a shared address book that can be viewed by all users, and a personal address book that can be viewed by only a specific user, and
the processing circuitry periodically acquires the shared address book, and acquires the personal address book after authentication of a user, by using account information for identifying the user.

5. The information processing apparatus according to claim 4, wherein
when the shared address book is acquired by the processing circuitry,
the processing circuitry acquires the second information indicating the shared address book that is managed by the information processing apparatus, merges the shared address book that is acquired and the second information that is acquired, and performs processing of registering the merge information indicating the merged address book, and
when the personal address book is acquired by processing circuitry,
the processing circuitry acquires the second information indicating the personal address book that is managed by the information processing apparatus, merges the personal address book that is acquired and the second information that is acquired, and performs processing of registering the merge information indicating the merged address book obtained after merge.

6. The information processing apparatus according to claim 4, wherein
the processing circuitry acquires the personal address book when a predetermined time has passed since synchronization processing for updating the personal address book managed by the information processing apparatus is completed by merging the personal address book that is managed by the information processing apparatus with the personal address book that is acquired from the cloud after authentication of a user.

7. The information processing apparatus according to claim 1, wherein
the processing circuitry is further configured to:
set workflow information in which at least one component, which is a function of the processing circuitry, to be executed and an execution sequence are defined; and
execute the at least one component to be executed in the execution sequence based on the workflow information.

8. The information processing apparatus according to claim 1, wherein
at a time of merging the first information with the second information, the processing circuitry converts the differing label of the first information to match the label used in the second information for the same type of record based on the pre-stored conversion information indicating a correspondence between the differing label of the first information and the label of the second information for the same type of record.

9. A merge method performed by an information processing apparatus, the method comprising:
acquiring, by processing circuitry, from a corresponding cloud among a plurality of clouds that manage first information, the first information in a mode according to the cloud;
acquiring second information by the processing circuitry;
merging the first information acquired with the second information; and
performing processing based on merge information that is obtained by merging the first information and the second information, wherein the first information and the second information are information relating to an address book, the merge information is information relating to a merged address book obtained after merge,
wherein the first information is constituted of a plurality of records which each have a label to describe each type of record,
the second information is constituted of a plurality of records which each have a label to describe each type of record, and
the method includes merging at least one record included in the first information that has a differing label that is not the same as any of the labels included in the second information, where the at least one record of the first information is of a same type of at least one record included in the second information, by converting the differing label to match a label used in the second information for the same type based on a pre-stored conversion information which indicates labels used by each of the respective cloud servers to manage an identical type of element, wherein when at least one other record included in the first information is of a different type than each record included in the second information, the processing circuitry does not include the at least one other record as an object to be merged with the second information into the address book.

10. The merge method according to claim 9, wherein merging of the first information with the second information merges at least one record that is not correspondent with any of the records included in the second information out of the records included in the first information with the second information in descending order of update date.

11. The merge method according to claim 9, wherein performing of the processing performs registering the merge information.

12. The merge method according to claim 10, wherein the first information is any one of a shared address book that can be viewed by all users, and a personal address book that can be viewed by only a specific user, and
acquiring of the first information periodically acquires the shared address book, and acquires the personal address book after authentication of a user, by using account information for identifying the user.

13. The merge method according to claim 12, wherein when the shared address book is acquired at the acquiring of the first information,
acquiring of the second information acquires the second information indicating the shared address book that is managed by the information processing apparatus, and merging the first information with the second information merges the shared address book that is acquired at the acquiring of the first information and the second information that is acquired at the acquiring of the second information, and performing of the processing performs registering the merge information indicating the merged address book, and
when the personal address book is acquired at the acquiring of the first information,
the acquiring of the second information acquires the second information indicating the personal address book that is managed by the information processing apparatus, merging of the first information with the second information merges the personal address book that is acquired at the acquiring of the first information and the second information that is acquired at the acquiring of the second information, and performing of the processing performs registering the merge information indicating the merged address book obtained after merge.

14. The merge method according to claim 12, wherein the acquiring of the first-information acquires the personal address book when predetermined time has passed since synchronization processing for updating the personal address book managed by the information processing apparatus is completed by merging the personal address book that is managed by the information processing apparatus with the personal address book that is acquired from the cloud after authentication of a user.

15. The merge method according to claim 9, further comprising:
setting workflow information in which at least one component, which is a function of the processing circuitry, to be executed and an execution sequence are defined; and
executing the at least one component to be executed in the execution sequence based on the workflow information.

16. A computer program product comprising a non-transitory computer-readable medium including instructions, the instructions causing a computer to perform a method comprising:
acquiring, by processing circuitry, from a corresponding cloud among a plurality of clouds that manage first information, the first information in a mode according to the cloud;
acquiring second information by the processing circuitry;
merging the first information acquired with the second information; and
performing processing based on merge information that is obtained by merging the first information and the second information, wherein the first information and the second information are information relating to an address book, the merge information is information relating to a merged address book obtained after merge,
wherein the first information is constituted of a plurality of records which each have a label to describe each type of record,
the second information is constituted of a plurality of records which each have a label to describe each type of record, and
the method includes merging at least one record included in the first information that has a differing label that is not the same as any of the labels included in the second information, where the at least one record of the first information is of a same type of at least one record included in the second information, by converting the differing label to match a label used in the second information for the same type based on a pre-stored conversion information which indicates labels used by each of the respective cloud servers to manage an identical type of element, wherein when at least one other record included in the first information is of a different type than each record included in the second information, the processing circuitry does not include the at least one other record as an object to be merged with the second information into the address book.

* * * * *